United States Patent
Nagarajan

(10) Patent No.: US 7,782,992 B2
(45) Date of Patent: Aug. 24, 2010

(54) METHOD AND APPARATUS FOR SIGNAL SYNCHRONIZING

(75) Inventor: Balaji Nagarajan, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 803 days.

(21) Appl. No.: 11/676,315

(22) Filed: Feb. 19, 2007

(65) Prior Publication Data

US 2008/0198956 A1    Aug. 21, 2008

(51) Int. Cl.
*H04L 7/00*    (2006.01)
(52) U.S. Cl. ........................ 375/355; 375/371
(58) Field of Classification Search ............... 375/354, 375/355, 371, 373
See application file for complete search history.

(56) References Cited

U.S. PATENT DOCUMENTS

2004/0015670 A1* 1/2004 Chao ........................ 711/167

* cited by examiner

*Primary Examiner* — David B Lugo
(74) *Attorney, Agent, or Firm* — Prakash Nama; Global IP Services, PLLC

(57) ABSTRACT

A synchronizer and a method for synchronizing a communication signal are presented. The synchronizer comprises a first unit arranged for receiving a plurality of inputs. The plurality of inputs include at least an indicative of a source clock period of a source clock domain, an indicative of destination clock period of a destination clock domain and a communication signal. The first unit being configured for stretching the communication signal according to the indicative of the destination clock period and indicative of the source clock period. The synchronizer is further provided with a second unit. The second unit is configured for operating according to the indicative of destination clock period. The output of the first unit is provided to the second unit. The second unit is configured for providing a synchronizer output signal corresponding to the communication signal operable in the destination clock domain.

10 Claims, 4 Drawing Sheets

METHOD AND APPARATUS FOR SIGNAL SYNCHRONIZING

FIELD OF INVENTION

The invention relates to a method and apparatus for signal synchronizing, more particularly it relates to a synchronizer and method for synchronizing a signal for multiple clock domains.

BACKGROUND OF INVENTION

A digital circuit may have multiple blocks. Each block may have multiple digital devices. The digital devices operate according to a respective clock signal. Digital devices are generally clock edge sensitive. A digital device may be made to operate according to a positive edge of a clock signal and/or a negative edge of the clock signal. An edge of the clock signal according to which a digital device is made to operate is referred as an active edge of the clock signal. For the purpose of illustration hereinafter the discussion is presented assuming that all the devices operating according to positive edge of the clock signal.

Further, for the purpose of this discussion, setup time is defined as duration of minimum time before an active edge of the clock signal of a digital device, for which the signal is required to be present at the input of the digital device. Hold time is defined as duration of minimum time for which the signal is required to be present at the input of a digital device after an active edge of the clock signal of a digital device. FIG. 1 shows the hold time and setup time according to respective definitions.

Furthermore, for the purpose of this discussion, a meta-stable state is defined as a state of a digital device when output of the digital device in not valid. For example, an output of the digital device may oscillate or may be at a state which not identified as a valid state of the output. A digital device may come out of the meta-stable state on its own however, when the digital devices comes out of the meta-stable state, the output of the digital device is not known and it can assume any valid digital state that may not be the correct or desired digital state according to the inputs of the digital device.

Within a block the devices may operate according to a first clock signal that has particular characteristics, however digital devices of other blocks may operate according to another clock signal that may have characteristics different than the first clock signal. For communicating a correct and meaningful signal between blocks operating according to clock signals having different characteristics requires synchronizing of the signal. Synchronizing of the signal is critical for ensuring that the signal communicated from a source block to a destination block meets setup time and hold time requirements of the destination block. A communication signal meets these requirement is necessary for a block to ensure that the block or a digital device of the block does not enters into a meta-stable state.

To avoid such situations existing art provides a synchronizer, which ensures that a digital device does not enter into a meta-stable state. FIG. 2 shows a digital circuit 200 having a synchronizer 210. The digital circuit 200 has a source block 220 and a destination block 230. The source block 220 is operating according to a clock signal CLKA and the destination block 230 is operating according to a clock signal CLKB. The source and destination blocks 220 and 230 have flip-flops 222 and 232 respectively. The output of the flip-flop 222 is provided to the input of the flip-flop 232 via the synchronizer 210. The synchronizer 210 is generally a series of cascaded digital devices. Typically these digital devices are flip-flops. The synchronizer 210 operates according to the clock signal CLKB. The number of serially cascaded flip-flops determines the effectiveness of the synchronizer 210 for suppressing the meta-stability of destination block. The operation of the synchronizer 210 can be understood as follows.

The flip-flop 212 receives a communication signal from the source block 220. This communication signal may violate setup and hold time requirement of the flip-flop 212 of the synchronizer 210, which may lead to the flip-flop 212 in a meta-stable state. However since the flip-flop 212 operates according to clock CLKB, it is likely that the output (although a meta-stable output) of the flip-flop 212 will satisfy the setup and hold time requirement of the flip-flop 214 while the output of the flip flop 212 is oscillating or has settled after coming out of meta-stable state. Therefore, the input received by flip-flop 214 is an input that meets the setup and hold time of flip-flop 214 and hence the output of the flip-flop 214 may be a meta-stable free output. As the number of cascaded flip-flop is increased the probability of last flip-flop—that provides input to destination block—of the series being in a meta-stable state decreases. Accordingly likelihood of destination block receiving a signal that would force the digital devices of the destination blocks in a meta-stable state decreases.

The synchronizer 210 described above addresses issue of providing a meta-stable free input for the destination block. However this synchronizer 210 may provide an incorrect input to the destination block. To understand this behavior, consider an example in which a pulse signal of the source block is being synchronized using synchronizer 210. Suppose period of the clock signal CLKB differs from the clock signal CLKA by a small value or the period CLKB is significantly greater than the clock signal CLKA. In such cases as shown in FIG. 3, FIG. 4 and FIG. 5 it may be possible that a single clock cycle pulse can cause setup/hold time violation during two consecutive edges of the destination clock. The pulse might be missed completely in the destination clock domain. However, a pulse can be seen sometimes in the destination clock domain if either the destination flip-flop settles to the correct value after metastability or when the input signal met both the setup time and hold time of the flip-flop by chance.

FIG. 3 shows a timing diagram when, the clock signals CLKA and CLKB are have substantially the same period and are in phase with one another. SigA is the input of the synchronizer 210 and SigB is the output of the synchronizer 210. In this case any violation of step up/hold time at time T1 or T2 would result in an unknown state at SigB which is shown by hash.

FIG. 4 shows a timing diagram when, the clock signals CLKA and CLKB are have substantially the same period and are completely out of phase with one another. In this case a state transition of SigA may get partially registered at time T on SigB because no setup or hold time violation is observed at time T.

FIG. 5 shows a timing diagram when, the clock signal CLKA has a period substantially lower as compared to the clock signal CLKB. In this case a transition at time T1 and time T2 in SigA may completely go unregistered in SigB.

SUMMARY OF THE PRESENT SUBJECT MATTER

According to an aspect of the present subject matter a synchronizer is provided. The synchronizer may include a first unit arranged for receiving a plurality of inputs. The inputs may include at least an indicative of a source clock period of a source clock domain. The inputs may further include an indicative of destination clock period of a destination clock domain. The inputs also include a communication signal. The communication signal may a signal that is obtained from the source clock domain and may be required to be synchronized. The first unit being configured for stretching the communication signal according to the indicative of the destination clock period and indicative of the source clock period. The synchronizer also includes a second unit configured for operating according to the indicative of destination clock period and receiving output of the first unit. The second unit may be configured for providing a synchronizer output signal corresponding to the communication signal operable in the destination clock domain.

According to another aspect of the present subject matter a method for synchronizing signals is provided. The method may include the steps of receiving a plurality of inputs. The inputs may include at least an indicative of a source clock period of a source clock domain. The inputs may include an indicative of a destination clock period of a destination clock domain. The inputs may also include a communication signal. The method further may provide a step of stretching the communication signal according to the indicative of the destination clock period and indicative of the source clock period. The method may further provide a step of obtaining a synchronizer output signal corresponding to the communication signal operable in the destination clock domain.

According to a further aspect of the present subject matter an integrated chip is taught. The integrated chip includes the above synchronizer.

According to yet another aspect of the present subject matter a method for manufacturing the synchronizer is taught.

According to still another aspect of the present subject matter a computer readable medium is provided. The computer readable medium is operable with a computer system and having stored thereon instructions operable with an architectural simulator environment supported by the computer system. The computer readable medium includes instructions for synchronizing signals by executing steps described in above.

According to yet still another aspect of the present subject matter an article is taught. The article includes the computer readable medium.

BRIEF DESCRIPTION OF DRAWINGS

The invention is explained in greater detail below and is depicted in the drawing, in which.

DETAILED DESCRIPTION OF DRAWINGS

Figure 6:
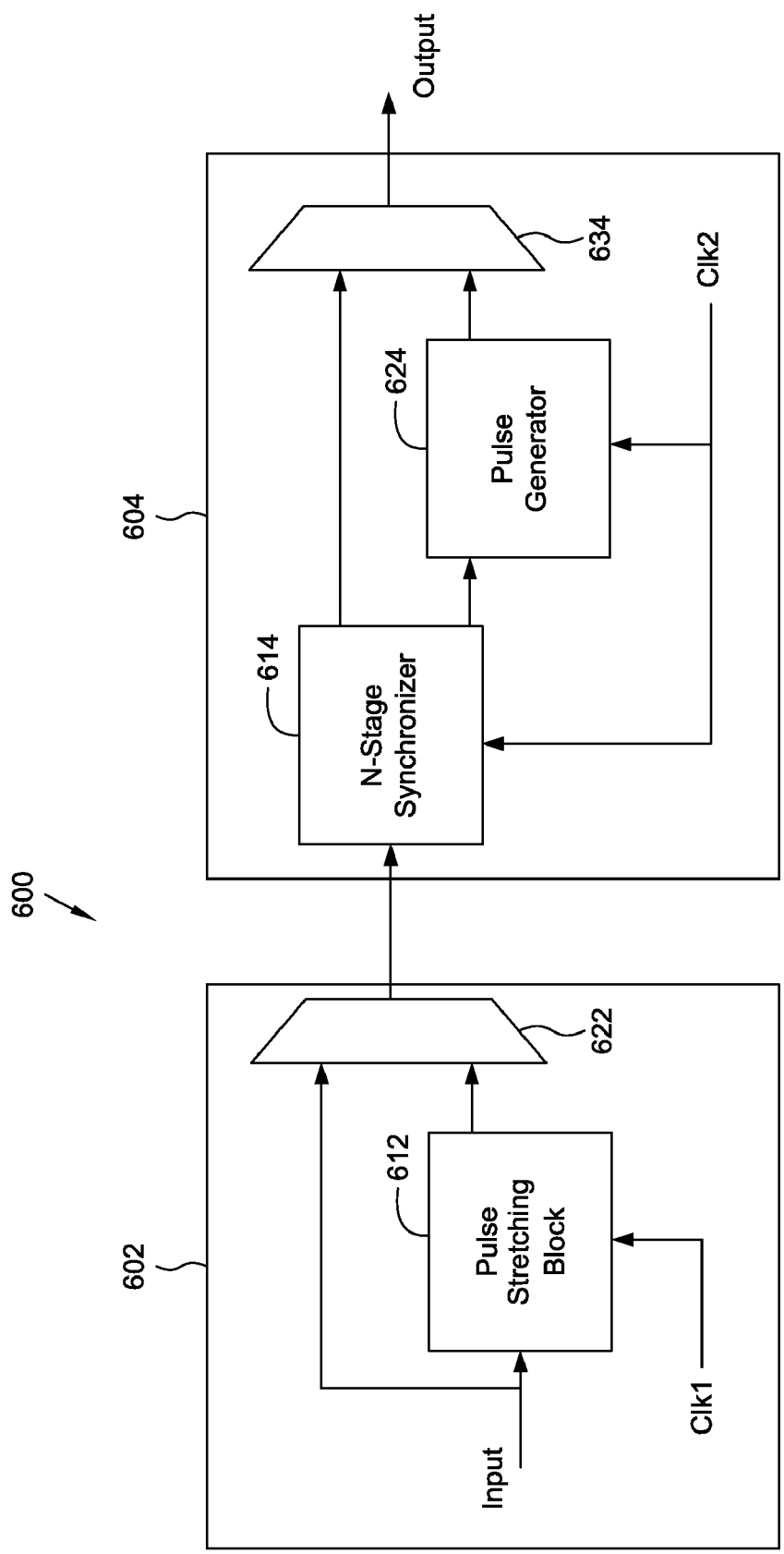
FIG. 6 shows an example synchronizer in accordance with present subject matter.

FIG. 6 shows a synchronizer 600 in accordance with present discussion. The synchronizer 600 includes a first unit 602. The first unit 602 has a pulse stretching block 612. The first unit 602 is arranged for receiving a number of inputs. The inputs may include at least an indicative of a source clock period of a source clock domain and an indicative of destination clock period of a destination clock domain. The inputs also include a communication signal. The input may also include an indicative of the communication signal type, which may identify the communication signal as a level type signal or a pulse type signal. Further, the communication signal type indicative may also indicate the pulse width of the communication signal in terms of number of clock cycles. The input may also include indicatives to indicate a number of stages that are required to be instantiated with in the synchronizer 600. More details regarding the number of stages will be discussed later. The communication signal may be provided by a source operating in the source clock domain according to the source clock period. The communication signal is required to be synchronized to the destination clock domain according to the destination clock period. To convert the communication signal to make it operable in the destination clock domain.

The pulse stretching block 612 is configured for checking the communication signal and the indicatives of source and destination clock periods. The communication signal may be of a pulse type signal or a level type signal. If the communication signal is a level type signal then it is directly passed to a second unit 604 bypassing the pulse stretching block 612 via multiplexer 622. Further at the second unit 604 the level type signal can be passed at the output via 634 bypassing a pulse generator 624. If the communication signal is of pulse type, then it is checked if the indicative of destination clock period indicates that the destination clock period is comparable or is greater than the source clock period indicated by the indicative of source clock period. If so, then pulses of the communication signal may be stretched. If not, then the communication signal may be passed to a second unit 604 via multiplexer 622 bypassing pulse stretching block 612. If the communication signal is a pulse type and the communication signal has a pulse then a pulse width of the pulse may be determined in terms of number of clock cycles of the source clock domain. A pulse of the communication signal may be stretched such that the pulse is detected by a second unit 604, which is made to operate according to the destination clock period.

The factor of stretching of the communication signal is determined according to a ratio of the source and destination clock periods. According to one possibility if the factor is not an integer then the communication signal may be stretched by a factor obtained by ceiling the ratio (by obtaining nearest integer value higher then the ratio). According to one possibility the stretching may be performed so that each pulse of the communication signal is at least once registered in the output signal of the synchronizer 600. According to another possibility the stretching factor may be computed according to following formula:

Stretching factor=Ceil((destination clock period+allowance)/(Source clock period))

Where, destination clock period and source clock period are obtained according to respective indicatives. The allowance is a time margin sufficient enough to meet the setup time and hold time in the destination clock domain (i.e Setup time+hold time). The function Ceil is a function which returns an integer value which is greater than or equal to the number which is specified as the argument to the function.

Stretching of the communication signal may be registered before the signal is passed to the second unit. This ensures that the clock domain crossing is performed from the output of a register to the input of the cascaded-synchronizer 614.

Stretching of the communication signal may be performed by allowing the communication signal to pass through one or more registers or delay elements for obtaining one or more delayed versions of the communication signal. Stretched version of the communication signal may be obtained by performing a logical AND or a logical OR operation or any other logical operation on the obtained delayed versions of the communication signal. The first unit 602 is configured for adaptively instantiating number of delay or registers according to the indicatives of the source and destination clock periods. This allows flexibility to use the synchronizer 600 for multiple source and destination clock domains without requiring manual coding for different clock domains. The synchronizer 600 only requires inputs as mentioned earlier.

Figure 1:
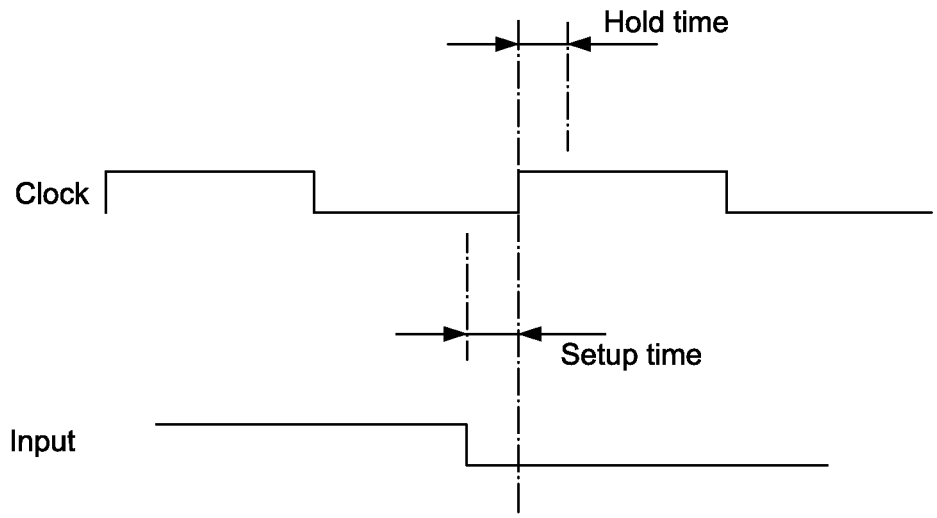
FIG. 1 shows a timing diagram illustrating hold and setup time.
Figure 2:
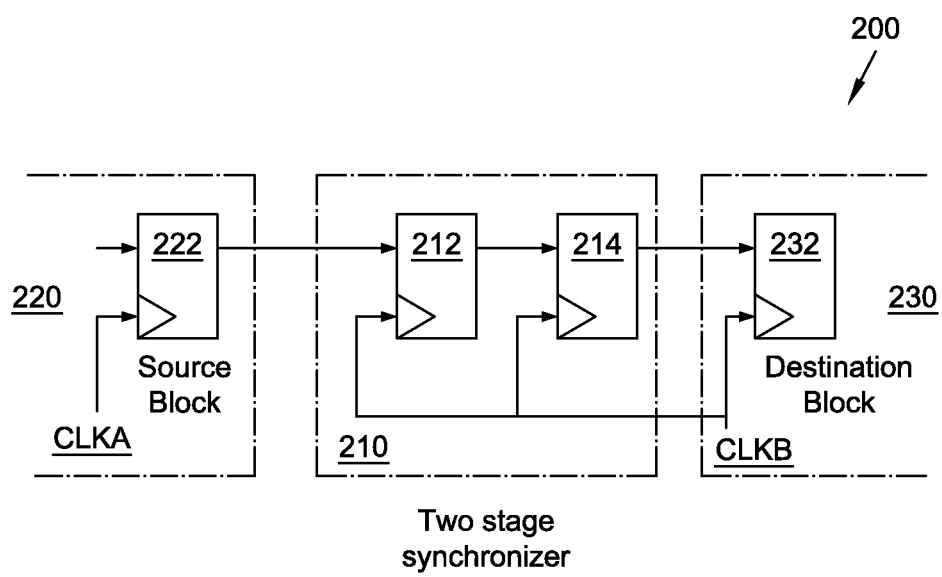
FIG. 2 shows a typical digital circuit having a synchronizer.
Figure 3:
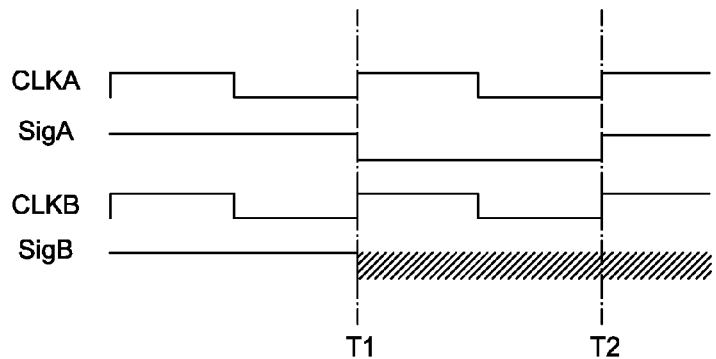
FIG. 3-5 show timing diagrams depicting inputs and outputs of the synchronizer.
Figure 4:
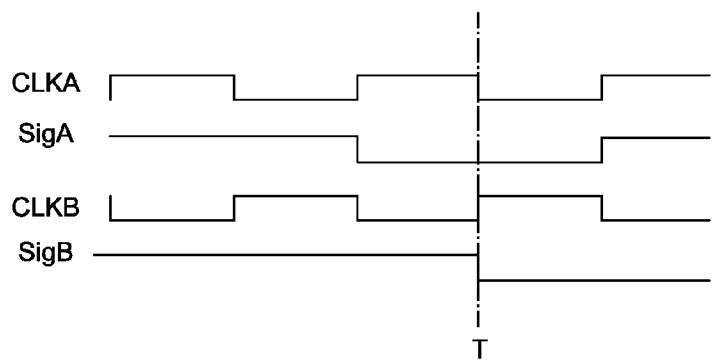
Figure 5:
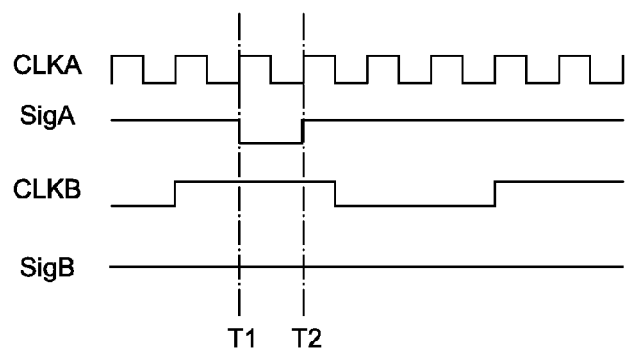

The output of the first unit 602 is provided to the second unit 604. The second unit 604 is configured for operating according to the clock period indicated by the indicative of destination clock period. The second unit 604 includes a cascaded-synchronizer 614. The cascaded-synchronizer may be an N-stage synchronizer. The cascaded synchronizer 614 may be instantiated according to the indicative of number of stages in the cascaded synchronizer 614. The indicative of the number of stages may be computed according to a relation between the source clock period and the destination clock period. The cascaded synchronizer 614 may include registers. The cascaded synchronizer 614 receives output of the first unit 602. The cascaded-synchronizer 614 may include a number of registers as described for block 210 of FIG. 2. The cascaded-synchronizer 614 adaptively adjusts the received input signal for converting it into a signal that is operable in the destination clock domain. This is achieved by ensuring that setup and hold time of the output of the cascaded-synchronizer 614 meets the requirement as desired by the destination clock domain. This provides that the output of the cascaded-synchronizer 614 is an output that is acceptable by the destination clock domain and may not lead any device of the destination clock domain to meta-stable state.

The second unit 604 further includes a pulse generator 624 coupled to the output of the cascaded-synchronizer 614. The pulse generator 624 being configured for generating the synchronizer output signal in the destination clock domain substantially analogous to the communication signal in the source clock domain. The function of the pulse generator 624 may be understood by as follows. Suppose a pulse in the communication signal is two clocks wide in the source clock domain. Then it is desirable that after stretching the pulse, as observed at the output of the synchronizer 600, should be two clocks wide in the destination clock domain. However, in due course of stretching and/or synchronizing in block 614 because of after metastability the cascaded synchronizer 614 might have fallen into a state which may give an impression that its output is wider by one more clock which is not desirable.

For ensuring that such situation does not affect the output of the synchronizer 600 adversely, the pulse generator 624 is provided. If an output signal is not appropriately stretched then the pulse generator 624 may by clipping the length of the stretched signal or stretching the signal further, generate the output of the synchronizer in the destination clock domain which is analogues to the communication signal in the source clock domain. For allowing the pulse generator 624 to do so, the pulse generator 624 may be instantiated to include a number of register, delay elements or other logic elements according to the relation between the indicative of the source clock period and the indicative of the destination clock period. The pulse generator 624 generates a pulse that is operable in destination clock domain whose pulse width in the destination clock domain in terms of number of clock cycles is same as the pulse width of the communication signal in terms of number of clock cycles in the source clock domain.

Similar to the first unit 602, the second unit 604 may also instantiate number of registers, delay elements or other logic elements for configuring the cascaded-synchronizer 614 and pulse generator 624 according to the indicative of the destination clock period and/or the indicative of the source clock period and/or the indicative of number stages. This provides the flexibility to use the synchronizer for multiple clock domains.

Figure 7:
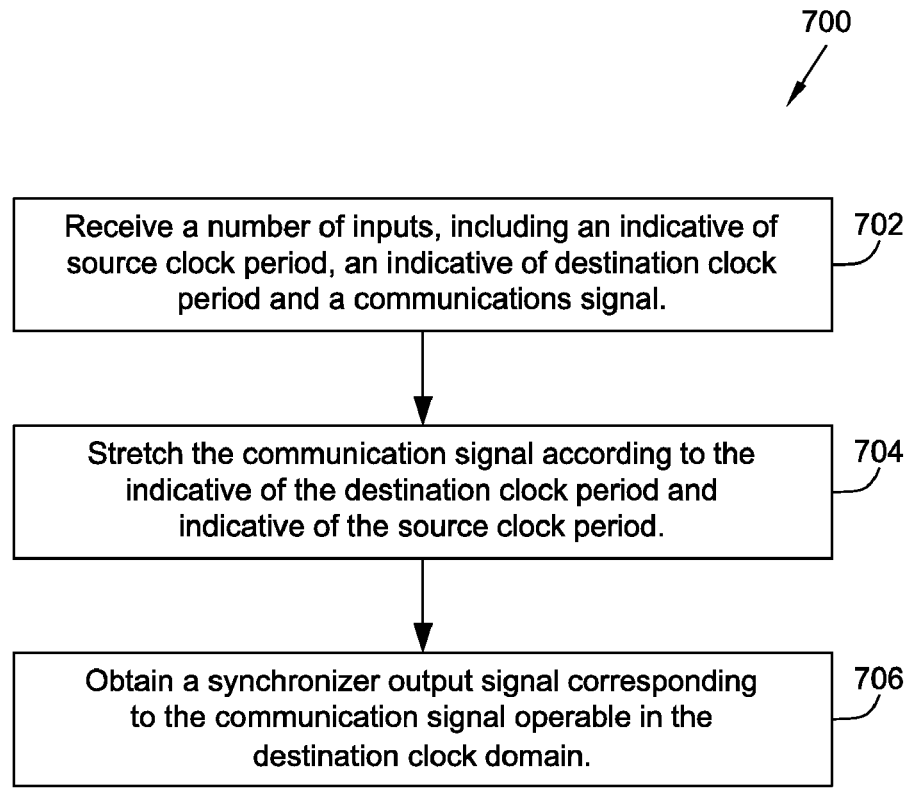
FIG. 7 shows a flow diagram depicting a method for synchronizing signals according to an embodiment of the present subject matter.

The present discussion further provides a method for synchronizing a communication signal. FIG. 7 depicts a flow diagram representing steps 700 followed for performing the method according to present subject matter. According to the method at a first step 702 a number of inputs are received. The inputs include at least an indicative of a source clock period of a source clock domain, an indicative of a destination clock period of a destination clock domain, and the communication signal. The input may also include an indicative of number stages. At a step 704 stretching of the communication signal is performed according to the indicative of the destination clock period and indicative of the source clock period. At a step 706 a synchronizer output signal corresponding to the communication signal operable in the destination clock domain is obtained.

Figure 8:
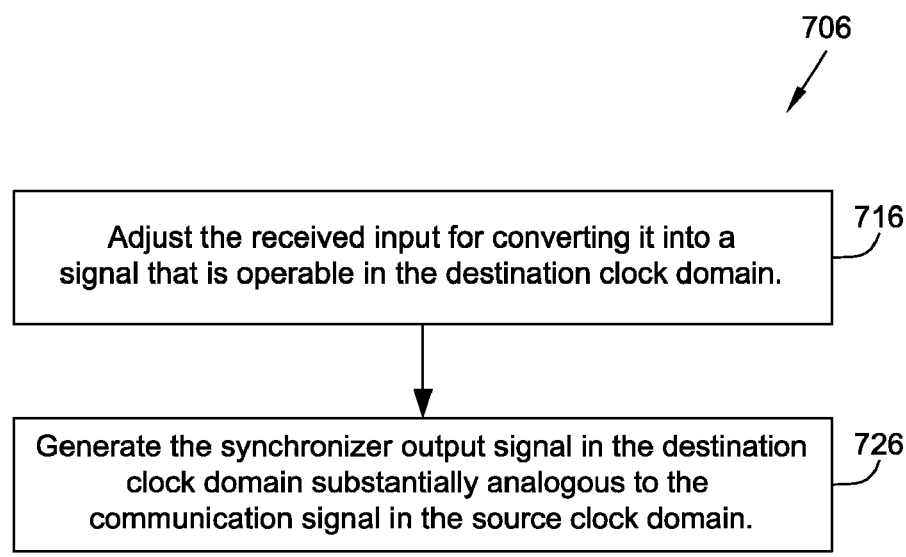
FIG. 8 shows the method of FIG. 7 in more details according to an embodiment of the present subject matter.

FIG. 8 shows the step 706 in more detail. According to possibility the step 706 of obtaining the synchronizer output may include a step 716 of adjusting the received input for converting it into a signal that is operable in the destination clock domain. This step may be performed by a cascaded-synchronizer. The step 706 may further include a step 726 of generating the synchronizer output signal in the destination clock domain substantially analogous to the communication signal in the source clock domain.

The present subject matter further provides a method for manufacturing a synchronizer and it also provides an integrated chip including the synchronizer as discussed above.

In addition the discussion further provides a computer readable medium. The computer-readable medium having stored thereon instructions operable with an architectural simulator environment supported by the computer system, the medium comprising instructions for synchronizing signals by executing the methods described above. Furthermore an article is taught. The article includes the computer readable medium.

Although the description includes various steps that are arranged serially in the exemplary embodiments, other embodiments of the subject matter may execute two or more steps in parallel, using multiple processors or a single processor organized as two or more virtual machines or sub-processors.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The methods described-above with respect to the method can be performed in a different order from those shown and described herein.

FIGS. 1-8 herewith are merely representational and are not drawn to scale. Certain proportions thereof may be exaggerated, while others may be minimized. All the figures illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A synchronizer comprising:
a first unit arranged for receiving a plurality of inputs, the plurality of inputs include at least an indicative of a source clock period of a source clock domain, an indicative of destination clock period of a destination clock domain and a communication signal, the first unit being configured for stretching the communication signal according to a ceil of a ratio of the indicative of the destination clock period and indicative of the source clock period; and
a second unit configured for operating according to the indicative of destination clock period and receiving output of the first unit, the second unit being configured for providing a synchronizer output signal corresponding to the communication signal operable in the destination clock domain.

2. A synchronizer comprising:
a first unit arranged for receiving a plurality of inputs, the plurality of inputs include at least an indicative of a source clock period of a source clock domain, an indicative of destination clock period of a destination clock domain and a communication signal, the first unit being configured for stretching the communication signal according to the indicative of the destination clock period and indicative of the source clock period; and
a second unit configured for operating according to the indicative of destination clock period and receiving output of the first unit, the second unit being configured for providing a synchronizer output signal corresponding to the communication signal operable in the destination clock domain, wherein the second unit comprises:
a cascaded-synchronizer arranged for receiving input from the first unit and configured for adaptively adjusting the received input for converting it into a signal that is operable in the destination clock domain; and
a pulse generator coupled to the output of the cascaded-synchronizer, the pulse generator being configured for generating the synchronizer output signal in the destination clock domain substantially analogous to the communication signal in the source clock domain.

3. A method for synchronizing signals in a synchronizer comprising the steps of:
receiving a plurality of inputs, the inputs include at least an indicative of a source clock period of a source clock domain, an indicative of a destination clock period of a destination clock domain, and a communication signal;
stretching the communication signal according to a ceil of a ratio of the indicative of the destination clock period and indicative of the source clock period; and
obtaining a synchronizer output signal corresponding to the communication signal operable in the destination clock domain.

4. The method as claimed in claim 3, wherein the step of obtaining includes the steps of:
adaptively adjusting the received input for converting it into a signal that is operable in the destination clock domain; and
generating the synchronizer output signal in the destination clock domain substantially analogous to the communication signal in the source clock domain.

5. An integrated chip having a synchronizer, the synchronizer comprising:
a first unit arranged for receiving a plurality of inputs, the inputs include at least an indicative of a source clock period of a source clock domain, an indicative of destination clock period of a destination clock domain and a communication signal, the first unit being configured for stretching the communication signal according to a ceil of a ratio of the indicative of the destination clock period and indicative of the source clock period; and
a second unit configured for operating according to the indicative of destination clock period and receiving output of the first unit, the second unit being configured for providing a synchronizer output signal corresponding to the communication signal operable in the destination clock domain.

6. An integrated chip having a synchronizer, the synchronizer comprising:
a first unit arranged for receiving a plurality of inputs, the inputs include at least an indicative of a source clock period of a source clock domain, an indicative of destination clock period of a destination clock domain and a communication signal, the first unit being configured for stretching the communication signal according to the indicative of the destination clock period and indicative of the source clock period; and
a second unit configured for operating according to the indicative of destination clock period and receiving output of the first unit, the second unit being configured for providing a synchronizer output signal corresponding to the communication signal operable in the destination clock domain, wherein the second unit comprises:
a cascaded-synchronizer arranged for receiving input from the first unit and configured for adaptively adjusting the received input for converting it into a signal that is operable in the destination clock domain; and
a pulse generator coupled to the output of the cascaded-synchronizer, the pulse generator being configured for generating the synchronizer output signal in the destination clock domain substantially analogous to the communication signal in the source clock domain.

7. A method for manufacturing a synchronizer, the method comprising the steps of:
providing a first unit arranged for receiving a plurality of inputs, the inputs include at least an indicative of a source clock period of a source clock domain, an indicative of destination clock period of a destination clock domain and a communication signal, the first unit being configured for stretching the communication signal according to a ceil of a ratio of the indicative of the destination clock period and indicative of the source clock period; and providing a second unit configured for operating according to the indicative of destination clock period and receiving output of the first unit, the second unit being configured for providing a synchronizer output signal corresponding to the communication signal operable in the destination clock domain.

8. A method for manufacturing a synchronizer, the method comprising the steps of:

providing a first unit arranged for receiving a plurality of inputs, the inputs include at least an indicative of a source clock period of a source clock domain, an indicative of destination clock period of a destination clock domain and a communication signal, the first unit being configured for stretching the communication signal according to the indicative of the destination clock period and indicative of the source clock period; and providing a second unit configured for operating according to the indicative of destination clock period and receiving output of the first unit, the second unit being configured for providing a synchronizer output signal corresponding to the communication signal operable in the destination clock domain, wherein the step of providing the second unit comprises:

providing a cascaded-synchronizer arranged for receiving input from the first unit and configured for adaptively adjusting the received input for converting it into a signal that is operable in the destination clock domain; and providing a pulse generator coupled to the output of the cascaded-synchronizer, the pulse generator being configured for generating the synchronizer output signal in the destination clock domain substantially analogous to the communication signal in the source clock domain.

9. A non-transitory computer readable storage medium operable with a computer system, the computer readable medium having stored thereon instructions operable with an architectural simulator environment supported by the computer system, the medium comprising instructions for synchronizing signals in a synchronizer by executing steps of:

receiving a plurality of inputs, the inputs include at least an indicative of a source clock period of a source clock domain, an indicative of a destination clock period of a destination clock domain, and a communication signal;

stretching the communication signal according to a ceil of a ratio of the indicative of the destination clock period and indicative of the source clock period; and obtaining a synchronizer output signal corresponding to the communication signal operable in the destination clock domain.

10. The non-transitory computer readable storage medium as claimed in claim 9, wherein the step of obtaining includes the steps of:

adaptively adjusting the received input for converting it into a signal that is operable in the destination clock domain; and generating the synchronizer output signal in the destination clock domain substantially analogous to the communication signal in the source clock domain.

* * * * *